US008847968B2

(12) United States Patent
Rabii

(10) Patent No.: US 8,847,968 B2
(45) Date of Patent: Sep. 30, 2014

(54) DISPLAYING STATIC IMAGES

(75) Inventor: Khosro M. Rabii, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 541 days.

(21) Appl. No.: 13/181,300

(22) Filed: Jul. 12, 2011

(65) Prior Publication Data

US 2013/0016114 A1 Jan. 17, 2013

(51) Int. Cl.

| | |
|---|---|
| ***G06F 3/033*** | (2013.01) |
| ***G09G 5/08*** | (2006.01) |
| ***G06T 17/00*** | (2006.01) |
| ***G09G 5/39*** | (2006.01) |
| ***G09G 5/36*** | (2006.01) |
| *G09G 5/391* | (2006.01) |

(52) U.S. Cl.

CPC .......... *G09G 5/363* (2013.01); *G09G 2320/103* (2013.01); *G09G 2340/0414* (2013.01); *G09G 2360/121* (2013.01); *G09G 5/391* (2013.01); *G09G 2330/021* (2013.01); *G09G 2340/0421* (2013.01); *G09G 2340/0435* (2013.01)

USPC ............................ 345/531; 345/158; 345/428

(58) Field of Classification Search

CPC .................. G02B 2027/0147; G09G 2320/062

USPC ................................. 345/158, 207, 531, 428

See application file for complete search history.

(56) References Cited

U.S. PATENT DOCUMENTS 5,598,565 A 1/1997 Reinhardt
5,860,016 A 1/1999 Nookala et al.
6,333,745 B1 12/2001 Shimomura et al.
6,642,910 B2 11/2003 Takada et al.
6,992,675 B2 1/2006 Aleksic et al.
7,460,136 B2 12/2008 Jeffrey et al.
7,734,943 B2 6/2010 Whelan et al.
2002/0149607 A1 10/2002 Ito
2002/0163523 A1 11/2002 Adachi et al.
2003/0080967 A1 5/2003 Milch et al.
2006/0012714 A1 1/2006 Louie et al.
2007/0046684 A1 3/2007 Jeffrey et al.

(Continued)

FOREIGN PATENT DOCUMENTS

JP 2001022337 A 1/2001
WO 2010083740 A1 7/2010

OTHER PUBLICATIONS

Wei-Chung Chen; M. Pedram, Power minimization in a backlit TFT-LCD display by concurrent brightness and contrast scaling, Consumer Electronics, IEEE Transactions on; vol. 50 , Issue: 1, 25-32.*

(Continued)

*Primary Examiner* — Ke Xiao
*Assistant Examiner* — Robert Craddock
(74) *Attorney, Agent, or Firm* — Shumaker & Sieffert, P.A.

(57) ABSTRACT

Aspects of this disclosure may describe techniques to display a static image with reduced power consumption. In some examples, a graphics processing unit (GPU) may retrieve the static image from a system memory, scale the static image to a reduced spatial resolution version of the static image, and store the reduced spatial resolution version of the static image in local memory. A display processor may retrieve the reduced spatial resolution version of the static image from local memory. The display processor may rescale the reduced spatial resolution version of the static image, and display the rescaled image on a display for presentation.

34 Claims, 8 Drawing Sheets

(56) References Cited

U.S. PATENT DOCUMENTS

| | | | |
|---|---|---|---|
| 2007/0115213 | A1 | 5/2007 | Hsu et al. |
| 2008/0143695 | A1 | 6/2008 | Juenemann et al. |
| 2009/0251477 | A1 | 10/2009 | Su et al. |
| 2010/0007599 | A1 | 1/2010 | Kerofsky |
| 2010/0123648 | A1 | 5/2010 | Miller et al. |
| 2011/0080419 | A1 | 4/2011 | Croxford et al. |
| 2011/0285682 | A1 | 11/2011 | Kwan et al. |
| 2012/0056911 | A1 | 3/2012 | Safaee-Rad et al. |

OTHER PUBLICATIONS

Luo, "Designing Energy and User Efficient Interactions with Mobile Systems," School of Computer Science Institute for Software Research, Carnegie Mellon University (CMU-ISR-08-102), Apr. 2008, 119 pp.

U.S. Appl. No. 12/873,963, by Khosro M. Rabii, filed Sep. 1, 2010.

International Preliminary Report on Patentability—PCT/US2012/042089, The International Bureau of WIPO—Geneva, Switzerland, Sep. 20, 2013, 37 pp.

International Search Report and Written Opinion—PCT/US2012/042089—ISA/EPO—Dec. 12, 2012, 13 pp.

Second Written Opinion from International application No. PCT/US2012/042089, dated Jun. 24, 2013, 10 pp.

Response to Written Opinion dated Oct. 12, 2012, from International application No. PCT/US2012/042089, filed May 8, 2013, 28 pp.

Response to Second Written Opinion dated Jun. 24, 2013, from International application No. PCT/US2012/042089, filed Aug. 22, 2013, 28 pp.

* cited by examiner

DISPLAYING STATIC IMAGES

TECHNICAL FIELD

The disclosure relates to displaying an image, and more particularly, to power saving techniques for displaying an image.

BACKGROUND

Many different types of devices generate images for display on a display of the devices. In some examples, a generated image may be stored in the system memory of the devices. To display the generated image, circuitry within the devices may retrieve the generated image from the system memory and output the generated image to the display.

SUMMARY

This disclosure describes power saving techniques for displaying static images on a display of a device In some examples, circuitry, such as a display processor, may retrieve a static image from local memory, rather than a system memory, and display the static image on the display. The amount of power utilized to retrieve the static image from local memory may be less than the power utilized to retrieve the static image from system memory.

In one example, this disclosure describes a method comprising determining whether an image stored in at least a portion of a system memory that is accessible via a system bus is a static image or a non-static image. The method also includes retrieving, with a graphics processing unit (GPU), the static image from the portion of the system memory via the system bus when the image is determined to be the static image, scaling, with the GPU, the static image to generate a reduced spatial resolution version of the static image, and storing, with the GPU, the reduced spatial resolution version of the static image in a local memory of the GPU that is external to the system memory. The method further includes retrieving, with a display processor coupled to a display, the reduced spatial resolution version of the static image from the local memory, rescaling, with the display processor, the reduced spatial resolution version of the static image to generate a rescaled image, and outputting, with the display processor, the rescaled image to the display for presentation.

In another example, this disclosure describes an apparatus comprising a display, a system bus, a system memory that is accessible via the system bus, a local memory that is external to the system memory, one or more processing units, a graphics processing unit (GPU), and a display processor. The one or more processing units are operable to determine whether an image stored in at least a portion of the system memory is a static image or a non-static image. The GPU is operable to retrieve the static image from the portion of the system memory via the system bus when the image is determined to be the static image, scale the static image to generate a reduced spatial resolution version of the static image, and store the reduced spatial resolution version of the static image in the local memory. The display processor is operable to retrieve the reduced spatial resolution version of the static image from the local memory, rescale the reduced spatial resolution version of the static image to generate a rescaled image, and output the rescaled image to the display for presentation.

In another example, this disclosure describes an apparatus comprising a display, a system bus, a system memory that is accessible via the system bus and a local memory that is external to the system memory. The apparatus also includes a means for determining whether an image stored in at least a portion of the system memory is a static image or a non-static image. The apparatus further includes a graphics processing unit (GPU) and a display processor. The a graphics processing unit (GPU) includes means for retrieving the static image from the portion of the system memory via the system bus when the image is determined to be the static image, means for scaling the static image to generate a reduced spatial resolution version of the static image, and means for storing the reduced spatial resolution version of the static image in a local memory of the GPU. The display processor includes means for retrieving the reduced spatial resolution version of the static image from the local memory, means for rescaling the reduced spatial resolution version of the static image to generate a rescaled image, and means for outputting the rescaled image to the display for presentation.

In another example, this disclosure describes a non-transitory computer-readable storage medium comprising instructions that cause one or more processing units to determine whether an image stored in at least a portion of a system memory that is accessible via a system bus is a static image or a non-static image. The instructions also include instructions to retrieve, with a graphics processing unit (GPU), the static image from the portion of the system memory via the system bus when the image is determined to be the static image, scale, with the GPU, the static image to generate a reduced spatial resolution version of the static image, and store, with the GPU, the reduced spatial resolution version of the static image in a local memory of the GPU that is external to the system memory. The instructions also include instructions to retrieve, with a display processor coupled to a display, the reduced spatial resolution version of the static image from the local memory, rescale, with the display processor, the reduced spatial resolution version of the static image to generate a rescaled image, and output, with the display processor, the rescaled image to the display for presentation.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1A:
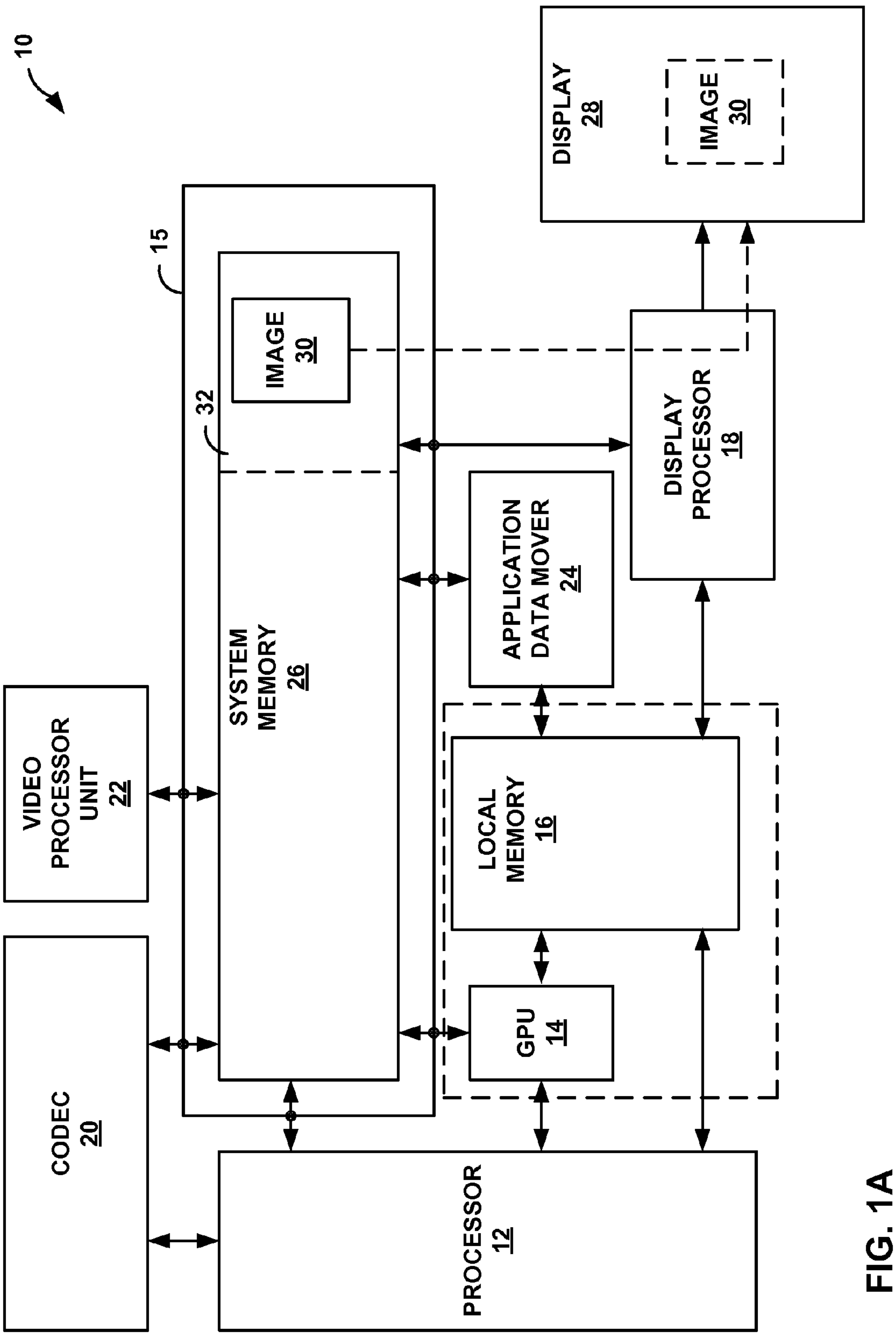
FIGS. 1A-1D are block diagrams illustrating an exemplary device consistent with this disclosure.

This disclosure relates to techniques for displaying static images that promote power saving. Techniques of this disclosure may be implemented in computing devices such as, but not limited to, televisions, desktop computers, and laptop computers that provide video or image content, e-book readers, media players, tablet computing devices, mobile reception devices, personal digital assistants (PDAs), video gaming consoles that include video displays, mobile conferencing units, mobile computing devices, wireless handsets, and the like.

Components such as a graphics processing unit (GPU), and potentially other components such as a video decoder, contribute content for generating an image for display. A static image may be a displayed image whose content does not change for a defined period of time. For instance, if none of the components that contribute to an image provide any new information that changes what is being displayed by the device for a defined period of time, the image that is being displayed by the device may be considered as a static image. For example, one or more processing units such as a processor on the device may monitor whether any component, such as the GPU, provides any new information that changes what is being displayed by the device. If the processor determines that there is no such new information, the processor may determine that the image being displayed is a static image. It should be understood, that a component, other than the processor, may monitor whether there is any new information, and determine that the image being displayed is a static image.

In some examples, there may be additional conditions that should be satisfied before an image can be determined to be a static image. For example, the environment in which the device is displaying the image should remain relatively constant. As one example, the ambient lighting, and the device orientation may need to remain constant for a defined period of time for the image that is being displayed by the device to be classified a static image. As another example, when the device is used with an external video interface, e.g., a mobile device connected to a TV via HDMI, the connection between the device and the external device may not change within the defined period of time. Changes to the environment within which the image is being displayed may potentially cause the image being displayed to change. Such a change in the image may cause the image to not be a static image.

It may not be necessary for any or all of the environmental conditions to be satisfied before an image can be determined to be a static image. In some examples, it may be sufficient to determine that none of the components that contribute to an image provided any new information that changes what is being displayed by the device for a defined period of time to determine that an image is a static image.

As one example, the defined period of time before an image is determined to be a static image may be approximately 15 seconds. However, aspects of this disclosure are not so limited. The defined period of time before an image is determined to be a static image may be programmable and may be different for different situations. For example, the defined period of time before an image is determined to be a static image may be ergodic, in that, various variables may effect the time before an image is determined to a static image. As one example, history of how long a user stays on one page may affect the amount of time before the image is determined to be a static image. As another example, the type of application executed by the user may determine how much time should elapse before an image can be determined to be a static image. There may be various other variables utilized to determine the amount of time before an image can be determined to be a static image, and aspects of this disclosure may be extendable to any such situations.

A static image or a non-static image, e.g., a dynamic image, may initially be stored in a system memory that is external to the GPU and is accessible via a system bus. As described in more detail, one or more processing units, such as the GPU, may store the static image, or a scaled version of the static image, within local memory utilized by the GPU. The local memory may be an on-chip memory of the GPU. In some examples, a display processor may retrieve non-static images from the system memory, and retrieve static images, or scaled versions of the static images, from the local memory. Non-static images may be images that change what is being displayed by the display within a defined period of time, whereas static images may be images that do not change on the display within the defined period of time. For example, when the display is presenting a playing video, the frame of the video that is being displayed may change within the defined period of time. However, when the video is paused, the frame of the video that is being displayed may not change within the defined period of time.

The display processor may repeatedly retrieve non-static images from the system memory at a first refresh rate, and update the display with the non-static images after each refresh cycle at the first refresh rate. In some examples, the display processor may repeatedly retrieve static images from the local memory at a second refresh rate, which may be less than the first refresh rate, and repeatedly output the static images to the display after each refresh cycle at the second refresh rate. In some alternate examples, it may be possible for the first and second refresh rates to be the same. However, in some non-limiting example implementations, there may be a reduction in power consumption if the second refresh rate is less than the first refresh rate.

When an image is determined to be a static image, the GPU may be performing limited graphics processing or no graphics processing. In other words, when the display is displaying a static image, the GPU may be dormant. When the GPU is dormant, portions of the local memory assigned to the GPU may be unused. As described in more detail, aspects of this disclosure may store a scaled version of the static image within the local memory when the local memory is unused by the GPU for graphics processing.

In some examples, it may not be pertinent which component produced the image that was determined to be a static image. For example, the GPU or another component, such as the video decoder, may have produced the static image. However, when the image is determined to a static image, regardless of which component generated the static image, the portions of the local memory assigned to the GPU may be unused. For example, regardless of which component generated the image, when the image is determined to be a static image, the GPU may be dormant, even if the GPU was not the component that generated the static image. In some examples, because the portion of the local memory that is assigned to the GPU may be unused when the image is determined to be a static image, the portion of the local memory that is assigned to the GPU may be suitable for storing a scaled version of the static image.

The local memory may be referred to as on-chip memory for various components of the device, whereas the system memory is off-chip and may require a system bus for data access. In general, the GPU may be able to retrieve data from and store data into the local memory much faster and with less power consumption than the system memory of the device. Similarly, other components, such as the display processor, may be able to retrieve data from and store data into the local memory much faster and with less power consumption than the system memory of the device.

As described above, in some examples, the display processor may retrieve the image from the system memory for display. In some of the examples described in this disclosure, when a scaled version of the static image is stored in the local memory, the display processor may retrieve such an image from the local memory, rather than the system memory. With simulation, it was found that the display processor may consume approximately one-tenth of the power needed to retrieve the static image from the local memory, as compared to retrieving the static image from the system memory, e.g., via a system bus. In this manner, aspects of this disclosure may reduce the amount of power consumed to display a static image.

In some examples, one or more processing units, e.g., a GPU, may first generate a scaled version of the static image, i.e., a scaled static image. The scaled version of the static image may be a version of the static image with reduced spatial resolution. In some examples, the amount of storage needed to store the scaled version of the static image may be less than the amount of storage needed to store the static image. It may be appropriate for the GPU to generate the scaled static image because the amount of storage provided by the local memory may be less than the amount of storage needed to store the entire static image. It should be understood that when the amount of storage provided by the local memory is greater than or equal to the amount of storage needed to store the entire static image, the GPU may not need to scale the static image. For purposes of illustration, however, it is assumed that the GPU may scale the static image to a reduced spatial resolution. For display, the display processor may rescale the static image, and output the rescaled image to the display for presentation.

Furthermore, displays for different devices may be configured for different display resolutions, e.g., the number of displayed pixels. By scaling the static image, techniques of this disclosure may be extendable to devices with different display resolutions.

To generate the scaled static image, the GPU may read a copy of the static image from the system memory. The GPU may then scale the static image such that the amount of storage needed to store the scaled static image is less than or equal to the amount of storage provided by the local memory. For example, the GPU may substitute pixel values for a block of 2×2 pixels with a pixel value for a single pixel. In this manner, the GPU may scale the static image by a factor of four, thereby reducing the amount of storage needed to store the static image by a factor of four. The technique of substituting pixel values for a block of pixels with a pixel value for a single pixel may be referred to as decimation.

There may be other techniques with which the GPU may scale the static image, and examples in this disclosure are not limited to the example scaling techniques described herein. Also, when scaling the static image, the GPU may not be performing other graphics processing functions that change the content of the image being displayed. For example, if the GPU were performing other graphics processing functions, the output of the GPU may change the image being displayed, which in turn may cause the image to no longer be a static image.

In some examples, the GPU may store the scaled static image, e.g., a reduced spatial resolution version of the static image, in the local memory. In some alternate examples, the GPU may temporarily store the scaled static image in the system memory, retrieve the scaled static image from the system memory, and store the scaled static image in the local memory.

The display processor may then retrieve the scaled static image, e.g., the reduced spatial resolution version of the static image, from the local memory for display, instead of the static image from the system memory via the system bus. The display processor may consume less power retrieving an image from the local memory as compared to retrieving an image from the system memory. In some examples, the display processor may rescale the scaled static image and provide the rescaled static image to the display. The resolution of the rescaled static image may not be as full or dense as the resolution of the original static image. However, the user viewing the display may not be able to discern the reduction in clarity.

As described above, aspects of this disclosure may promote power savings by retrieving a scaled static image from the local memory for display, rather than retrieving a full resolution image from system memory. Aspects of this disclosure may also provide additional power saving techniques.

For example, as described above, the display processor may repeatedly retrieve images from the system memory at a predetermined refresh rate. The predetermined refresh rate may be relatively fast, e.g., 120 Hz, to display dynamic images (images that are changing what is being displayed). For a static image, there may be no need to refresh the display at such a relative fast rate because the content of the display is not changing. In some examples, the display processor may repeatedly output the rescaled static image at a second refresh rate, which may be less than the first refresh rate. The reduction in the refresh rate may also promote power savings because the number of times the display processor retrieves an image per unit of time may be reduced. Also, because the scaled image stored in the local memory is a reduced spatial resolution version of the static image, the number of bits that the display processor retrieves from local memory may be reduced per refresh cycle.

As another example, the display processor may reduce the illumination intensity of the pixels on the display on which the image is displayed. The reduction in the illumination intensity of the pixels on the display may also promote power savings.

FIGS. 1A-1D are block diagrams illustrating example components of device 10. Examples of device 10 include, but are not limited to, a television, a desktop computer, and a laptop computer that provide video or image content, an e-book reader, a media player, a tablet computing device, a mobile reception device, a digital media player, a personal digital assistant (PDA), a video gaming console, a mobile conferencing unit, a mobile computing device, a wireless handset, and the like.

As illustrated in FIGS. 1A-1D, device 10 may include components such as processor 12, graphics processing unit (GPU) 14, local memory 16, display processor 18, encoder/decoder (codec) 20, video processor unit 22, application data mover 24, system memory 26, and display 28. The dashed lines around GPU 14 and local memory 16 indicate that in some examples, GPU 14 and local memory 16 may be formed on a common integrated circuit (IC), as described in more detail below. Device 10 may also include system bus 15. Processor 12, graphics processing unit (GPU) 14, display processor 18, encoder/decoder (codec) 20, video processor unit 22, and application data mover 24 may access data from system memory 26 via system bus 15. Processor 12, graphics processing unit (GPU) 14, display processor 18, encoder/decoder (codec) 20, video processor unit 22, and application data mover 24 may access data from local memory 16 without using system bus 15.

Device 10 may include components in addition to those illustrated in FIGS. 1A-1D. For example, device 10 may include a speaker and a microphone, neither of which are shown in FIGS. 1A-1D, to effectuate telephonic communications in examples where device 10 is a mobile wireless telephone, or a speaker where device 10 is a media player. Device 10 may also include a transceiver for reception and transmission of data, a user interface for a user to interact with device 10, and a power supply that provides power to the components of device 10. In some examples, where display 28 is a touch-screen, display 28 may function at least partially as a user interface.

Processor 12, GPU 14, local memory 16, display processor 18, codec 20, video processor unit 22, and application data mover 24 may be formed as components in a single integrated circuit (IC) or a set of ICs (i.e., a chip set). In these examples, processor 12, GPU 14, display processor 18, codec 20, video processor unit 22, and application data mover 24 need not necessarily be separate hardware units within the IC. For purposes of illustration, the functionality of each of these components is described separately. However, such description is provided to ease understanding, and should not be interpreted to imply that these components are necessarily distinct components within the IC. In some alternate examples, processor 12, GPU 14, display processor 18, codec 20, video processor unit 22, and application data mover 24 may be formed as individual components, e.g., individual ICs. In these alternate examples, processor 12, GPU 14, display processor 18, codec 20, video processor unit 22, and application data mover 24 may communicate with one another over system bus 15, but may be able to communicate with local memory 16 without using system bus 15.

Processor 12, GPU 14, display processor 18, codec 20, video processor unit 22, and application data mover 24 may be implemented, individually or in combination, as one or more digital signal processors (DSPs), general purpose microprocessors, application specific integrated circuits (ASICs), field programmable logic arrays (FPGAs), or other equivalent integrated or discrete logic circuitry. In examples where GPU 14 is formed as an individual component, local memory 16 may be formed in GPU 14, i.e., as local, on-chip memory with GPU 14. For purposes of illustration, and ease of description, local memory 16 is illustrated as being external to GPU 14. Local memory 16 may be referred to as the local memory of GPU 14.

Various components of device 10 may be able to access local memory 16 quickly and with low power consumption. For example, local memory 16 may be the on-chip memory for an IC that includes components such as processor 12, GPU 14, display processor 18, codec 20, video processor unit 22, and application data mover 24. Examples of local memory 16 include cache memory or registers, or any other type of local memory that can be accessed quickly, and in some examples can be accessed without using system bus 15. Processor 12, GPU 14, display processor 18, codec 20, video processor unit 22, and application data mover 24 may be able to retrieve data from and store data into local memory 16 much faster and with lower power consumption as compared to storing data into or retrieving data from system memory 26 via system bus 15.

As illustrated, system memory 26 may be external to processor 12, GPU 14, local memory 16, display processor 18, codec 20, video processor unit 22, and application data mover 24. Because system memory 26 is external, processor 12, GPU 14, display processor 18, codec 20, video processor unit 22, and application data mover 24 may communicate with system memory 26 via system bus 15. Due to bandwidth limitations and data scheduling, communication between processor 12, GPU 14, display processor 18, codec 20, video processor unit 22, and application data mover 24 and system memory 26 may be slower than communication with local memory 16 that does not include a separate bus or require extensive scheduling. Also, the power consumed to transfer data along the system bus to or from system memory 26 may be greater than the power consumed to transfer data to or from local memory 16 that does not include the separate bus.

For example, to retrieve data from system memory 26, display processor 18 may need to ensure that it is scheduled to communicate over system bus 15. If display processor 18 is not scheduled to communicate over system bus 15, display processor 18 may potentially remain idle. Also, the amount of power needed by display processor 18 to communicate over system bus 15 may be greater than the amount of power needed by display processor 18 to communicate directly with local memory 16, and without using system bus 15.

Processor 12 may be a processor that executes one or more applications. For example, processor 12 may execute applications such as web browsers, e-mail applications, spreadsheets, video games, media players, or other applications that generate viewable content for display. Processor 12 may the central processing unit (CPU) of device 10. In these examples, processor 12 may instruct the various components of device 10 to perform the functions for which they are configured to perform.

As one example, codec 20 may receive instructions that it decodes and provides to processor 12 for execution. Codec 20 may be an encoder/decoder. For example, codec 20 may receive encoded data, decode the encoded data, and provide the decoded data to processor 12 and/or system memory 26. As another example, codec 20 may receive data, encode the data, and transmit the encoded data. In some examples, codec 20 may be video encoder and video decoder. In these examples, codec 20 may retrieve portions of stored video in system memory 26, decode the portions of the stored video, store the decoded portion back in system memory 26 for subsequent playback.

In some examples, the instructions for the applications that are executed by processor 12 may be stored in system memory 26. Examples of system memory 26 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store data or instructions. In some aspects, system memory 26 may include instructions that cause the various processing units, e.g., the example components illustrated in FIGS. 1A-1D, to perform their described functions. Accordingly, system memory 26 may be a computer-readable storage medium comprising instructions that cause one or more processing units to perform various functions.

System memory 26 may, in some examples, be considered as a non-transitory storage medium. The term "non-transitory" may indicate that the storage medium is not embodied in a carrier wave or a propagated signal. However, the term "non-transitory" should not be interpreted to mean that system memory 26 is non-movable. As one example, system memory 26 may be removed from device 10, and moved to another device. As another example, a system memory, substantially similar to system memory 26, may be inserted into device 10. In certain examples, a non-transitory storage medium may store data that can, over time, change (e.g., in RAM).

GPU 14 may receive attributes for the images generated by processor 12 and perform graphics related processing on the received attributes. For instance, GPU 14 may determine pixel values for each of the pixels of an image that are to be displayed on display 28. For example, GPU 14 may determine color values, e.g., red-green-blue (RGB) values or luma and chrominance values, opacity values, e.g., alpha values, and texture values, if applicable, for each pixel of the image received from processor 12. In general, GPU 14 may perform functions such as lighting, shading, blending, culling, and other such graphics related processing for each pixel within an image. Examples of GPU 14 are illustrated in further detail in FIGS. 3A and 3B.

After GPU 14 determines the pixel values for the pixels within an image, GPU 14 may store the pixel values for the image within system memory 26. For example, as illustrated in FIG. 1A, system memory 26 stores image 30 within portion 32 of system memory 26. Image 30 may include the pixel values for each of the pixels within image 30 as determined by GPU 14.

Portion 32 of system memory 26 may be a reserved portion of system memory 26 that is reserved for storing images, such as image 30. The size of portion 32 may be sufficient to store pixel values of at least one image. For purposes of illustration, portion 32 may be considered as a display buffer or a frame buffer. However aspects of this disclosure should not be considered so limiting. Portion 32 may be any portion of system memory 26 that is reserved to store one or more images.

Video processor unit 22 may perform processing functions on video that is to be displayed. For example, video processor unit 22 may perform functions such as compression and decompression of video content. Video processor unit 22 may perform pre- and post-processing functions on the video content as well. For example, video processor unit 22 may perform functions such as noise-reduction, scaling, and rotating of video content.

Applicant data mover 24 may move stored data in system memory 26 into local memory 16. For example, processor 12, GPU 14, display processor 18, codec 20, and/or video processor unit 22 may cause application data mover 24 to retrieve data from system memory 26 and store the retrieved data in local memory 16.

In general, processor 12, GPU 14, codec 20, video processor unit 22, and application data mover 24 may each possibly contribute content for generating an image such as image 30, and storing image 30 in portion 32 of system memory 26. It may not be necessary for processor 12, GPU 14, codec 20, video processor unit 22, and application data mover 24 to simultaneously provide content for generating image 30. Rather, in some examples, only one of these components may provide content for generating image 30, and store the content of image 30 in portion 32 of system memory 26. However, aspects of this disclosure are not so limited, e.g., two or more of these components may simultaneously provide content for generating image 30.

Display processor 18 may be configured to initially retrieve stored image 30 from system memory 26 and output image 30 to display 28, as indicated by the dashed line extending from image 30, through display processor 18, and into display 28, and the dashed border of image 30 in display 28. In some examples, display processor 18 may be considered as a dedicated video-aware programmable direct memory access engine. For example, processor 12, GPU 14, codec 20, and/or video processor unit 22 may indicate to display processor 18 the location from where display processor 18 should retrieve image 30. Processor 12, GPU 14, codec 20, and/or video processor unit 22 may also indicate to display processor 18 what functions it should perform such as scaling, rotating, overlaying, and other such operations. As one example, as described in more detail, processor 12, GPU 14, codec 20, and/or video processor unit 22 may cause display processor 18 to re-scale a scaled image.

In some examples, display processor 18 may refresh display 28 at a predetermined refresh rate. For instance, display processor 18 may repeatedly retrieve image 30 from system memory 26 at a predetermined refresh rate. For example, display processor 18 may retrieve image 30 from system memory 26 at a refresh rate of 120 Hz, e.g., 120 times per second. After each refresh cycle, display processor 18 may cause display 28 to redisplay image 30. In other words, display processor 18 may refresh image 30 on display 28 120 times per second, in this example.

Display processor 18 may be configured to perform other functions as well. For example, display processor 18 may determine the illumination intensity of the pixels of display 28 based on ambient lighting. The illumination intensity of the pixels may indicate how bright the pixels appear on display 28. Higher illumination intensity levels may cause display 28 to consume more power.

In some examples, the content of image 30 may not change within a defined period of time. For example, the content of the image, e.g., image 30, being displayed by display 28 may not change within the defined period of time of none of the components, e.g., codec 20 or GPU 14, as a few examples, provide any new information to portion 32 of system memory 26 that stores image 30 within the defined period of time. If the content of image 30 does not change for the defined period of time, image 30 may be determined to be a static image. For instance, if none of processor 12, GPU 14, video processor unit 22, and application data mover 24 provides any new information that changes the content of image 30 within 15 seconds, image 30 may be classified as a static image. In other words, if the content of the image being displayed by display 28 does not change within a defined period of time, the image being displayed by display 28 may be determined to be a static image.

The example of 15 seconds for the period of time to classify image 30 as a static image is provided for purposes of illustration, and should not be considered as limiting. The period of time before image 30 is classified as a static image may be based on various criteria. For example, the factors may be the amount of time a user has historically stayed on one page. Other factors may be type of application that the user is executing, or the type of device that the user is using. In general, the amount of time that should elapse before image 30 can be classified as a static image may be programmable based on pertinent criteria that may be dependent on the particular implementations. In some instances, approximately 15 to 60 seconds may be a suitable range for the defined period of time before image 30 is classified as a static image. However, aspects of this disclosure are not so limited.

In the example above, processor 12, GPU 14, codec 20, video processor unit 22, and application data mover 24 may not have provided any new information to portion 32 of system memory 26 that stores image 30 within 15 seconds. If, however, any one or more of processor 12, GPU 14, codec 20, video processor unit 22, and application data mover 24 provided any new information to portion 32 of system memory 26 that stores image 30 within 15 seconds, image 30 may be considered to be a dynamic image, and not a static image. Aspects of this disclosure are not limited to this example. As described above, the period of time that should elapse before image 30 is determined to be a static image may be selectable, and different for different examples of device 10.

For purposes of illustration, the following describes a few examples of a static image. As one example, a static image may be a page on device 10 that the user is reading. The page may be a page of a book in examples where device 10 is an e-book reader. The page may also be an e-mail or a website. The page being displayed by display 28 may remain static, as the user is reading the page, and may change after the user moves on to another page on the e-book reader, exits the current e-mail, or loads another website. The amount of time it takes a user to read a page may be more than sufficient to classify the page as a static image.

As another example, a static image may be the home-screen of device 10. The home-screen may be the main starting screen from where the user can access content of device 10. The image content of the home-screen may not change often. When the user is viewing the home-screen for more than the defined time period of time, the home-screen may be classified as a static image.

As yet another example, the user may be viewing a video such as a downloaded movie or via a camcorder coupled to device 10. In this example, codec 20 may be writing image data to portion 32 of system memory 26. When the user pauses, finishes, or stops the video, the image displayed on display 28 may remain constant for more than the defined period of time. In this example, the resulting image displayed on display 28 may be classified as a static image.

There may be multiple different causes for image 30 to be classified as a static image. Aspects of this disclosure may be extendable to any such examples, and should not be considered limited to the examples above.

Processor 12 may determine that image 30 is a static image when none of processor 12, GPU 14, video processor unit 22, and application data mover 24 provides any new information that changes the content of image 30. As one example, processor 12 may monitor the content of portion 32 of system memory 26. If the content of portion 32 of system memory 26 does not change within a defined period of time, processor 12 may determine that the image stored within portion 32, e.g., image 30, is a static image.

As another example, processor 12 may monitor the outputs of processor 12, GPU 14, video processor unit 22, and application data mover 24. If none of processor 12, GPU 14, video processor unit 22, and application data mover 24 outputs any new information that changes the content of portion 32, processor 12 may determine that the image stored within portion 32, e.g., image 30, is a static image. If, however, the content of portion 32 of system memory 26 changes, processor 12 may determine that the image displayed by display 28 is not a static image because the images displayed by display 28 are changing within the defined period of time.

In some examples, a component, other than processor 12, may determine that image 30 is a static image. For purposes of illustration, aspects of this disclosure are described in the context of processor 12 determining whether image 30 is a static image. However, to indicate that in some examples, processor 12, or another component may determine that image 30 is a static image, aspects of this disclosure may describe one or more processing units as determining that image 30 is a static image.

In some examples, there may be additional criterion that should be satisfied before one or more processing units, e.g., processor 12, determine that image 30 is a static image. These additional criteria may be based on the environment of device 10. For example, the environment in which display 28 is displaying image 30 should remain relatively constant. As one example, the ambient lighting and device orientation may need to remain constant for the defined period of time for image 30 to be classified as a static image. For example, device 10 may include one or more sensors that detect the ambient lighting. Processor 12 may monitor the output of these sensors to determine if there is any change in the ambient lighting. As another example, device 10 may include one or more accelerometers or gyroscopes that determine the orientation of device 10. Processor 12 may monitor the output of the accelerometers or gyroscopes to determine if there is any change in the orientation of device 10. As another example, device 10 may be coupled to another device, e.g., device 10 is connected to a TV via an HDMI cable. In these examples, the connection between device 10 and the another device may not change, e.g., the HDMI cable may not be removed during the time period in which processor 12 classifies image 30 as a static image.

Changes to the environment within which image 30 is being displayed may potentially cause image 30, or at least the appearance of image 30, as displayed, to change. Such a change to image 30 may cause image 30 to not be a static image. For example, when the user rotates device 10 by 90°, processor 12 may also rotate image 30 by 90°. Such change in rotation may change image 30, e.g., resizing the content of image 30, which in turn may cause image 30 to not be a static image.

It may not be necessary for any or all of the environmental conditions to be satisfied before image 30 can be considered a static image. In some examples, it may be sufficient for the one or more processing units to determine that none of the components that contribute to image 30 provide any new information that changes image 30, e.g., changes what is being displayed by display 28, for a defined period of time.

In some of the example implementations described in this disclosure, when image 30 is classified as a static image, GPU 14 may be performing very little graphics processing, or no graphics processing. For example, for image 30 to be classified as a static image, GPU 14 may not be outputting any new information into portion 32 of system memory 26. For GPU 14 to not output any new information, GPU 14 may not be performing any graphics related operations. In other words, when image 30 is a static image, GPU 14 may be dormant or at least not actively performing graphics processing operations that provide new information to portion 32 of system memory 26.

In some examples, at least a portion of local memory 16 may be reserved for storing graphics data generated by GPU 14. When GPU 14 is dormant, the portion of local memory 16 that is reserved for storing graphics data generated by GPU 14 may be unused. Accordingly, in some examples, when image 30 is a static image, the portion of local memory 16 that is reserved for storing graphics data generated by GPU 14 may be unused.

When GPU 14 is not performing graphics related operations, e.g., when image 30 is a static image, GPU 14 may store a version of image 30 within the portion of local memory 16 that is reserved for storing graphics data generated by GPU 14. In some examples, prior to storing image 30, after it has been classified as a static image, GPU 14 may scale image 30. Scaling image 30 may be considered as reducing the spatial resolution of image 30. However, aspects of this disclosure should not be considered limited to requiring GPU 14 to scale image 30. The version of image 30 that GPU 14 stores in local memory 16 may be image 30 itself, or a scaled version of image 30. For purposes of illustration, examples described in the disclosure are described in the context where GPU 14 scales image 30 to generate a reduced spatial resolution version of image 30, after image 30 is determined to be a static image.

There may be at least two situations where it may possibly be appropriate for GPU 14 to scale image 30, after image 30 has been classified as a static image, and store the scaled version of image 30 in local memory 16. As one example, the amount of storage space in local memory 16, or in the portion of local memory 16 reserved for GPU 14, may not be sufficient to store the entirety of image 30. GPU 14 may scale image 30, e.g., reduce the resolution of image 30, based on the amount of storage space available in local memory 16. For example, GPU 14 may generate a reduced spatial resolution version of image 30 such that the amount of storage space needed to store the reduced spatial resolution version of image 30 is less than or equal to the amount of storage space in local memory 16, or in the portion of local memory 16 reserved for GPU 14. GPU 14 may then be able to store the scaled version of image 30 in local memory 16. In examples where the amount of storage provided by local memory 16 is greater than or equal to the amount of storage needed to store image 30, in its entirety, GPU 14 may not need to scale image 30.

As another example, the size of image 30 may be based on the size of display 28. The size of display 28 may be different for different types of device 10. The size of display 28 may indicate the number of pixels on display 28. For example, assuming the same resolution, the size of display 28 may be larger in examples where device 10 is a tablet computing device, as compared to the size of display 28 in examples where device 10 is a cellular telephone. In some examples, GPU 14 may scale image 30 to a fixed resolution regardless of the size of display 28. In this manner, aspects of this disclosure may be extendable to displays of various sizes.

There may be various techniques for GPU 14 to scale image 30, after image 30 is classified as a static image. One such example technique is referred to as decimation. In the decimation technique, GPU 14 may substitute pixel values for a block of pixels of image 30 with a pixel value for a single pixel. As one example, the block of pixels of image 30 may be a 2×2 block of pixels. In this example, GPU 14 may substitute the four pixel values in the 2×2 block of pixels with a single pixel value. In this manner, GPU 14 may scale image 30 by a factor of four, thereby reducing the amount of storage needed to store image 30 by a factor of four. The size of the block of pixels of image 30 that GPU 14 substitutes with a single pixel value may be selectable based on the storage capabilities of local memory 16 and the size of display 28.

The decimation example technique described above is described for purposes of illustration and to ease understanding. There may be other techniques with which GPU 14 may scale image 30, after image 30 is classified as a static image, and aspects of this disclosure should not be considered limited to the example technique of decimation. Also, when GPU 14 is scaling image 30, GPU 14 may not be performing other graphics processing functions that utilize local memory 16.

Scaling image 30 should not be confused with compressing image 30. In compression, the number of bits required to represent a pixel value of image 30 is reduced; however, the resolution of image 30 remains constant. In scaling, the resolution of image 30 may be reduced. For example, in scaling, the number of bits required to represent a pixel value of image 30 is the same as the number of bits required to represent a pixel value of a scaled version of image 30; however, the number of pixels, whose pixel values are stored, is reduced. In some examples, after GPU 14 scales image 30, GPU 14 may compress the scaled version of image 30.

In some examples, after GPU 14 scales image 30, GPU 14 may temporarily store the scaled version of image 30 in system memory 26. For example, GPU 14 may temporarily store the reduced spatial resolution version of image 30 in system memory 26. GPU 14 may then retrieve the scaled version of image 30 from system memory 26, and store the scaled version of image 30 in local memory 16. In an alternate example, GPU 14 may store the scaled version of image 30 in local memory 16 without first storing the scaled version of image 30 in system memory 26. For example, GPU 14 may directly store the reduced spatial resolution version of image 30 in local memory 16.

Figure 1B:
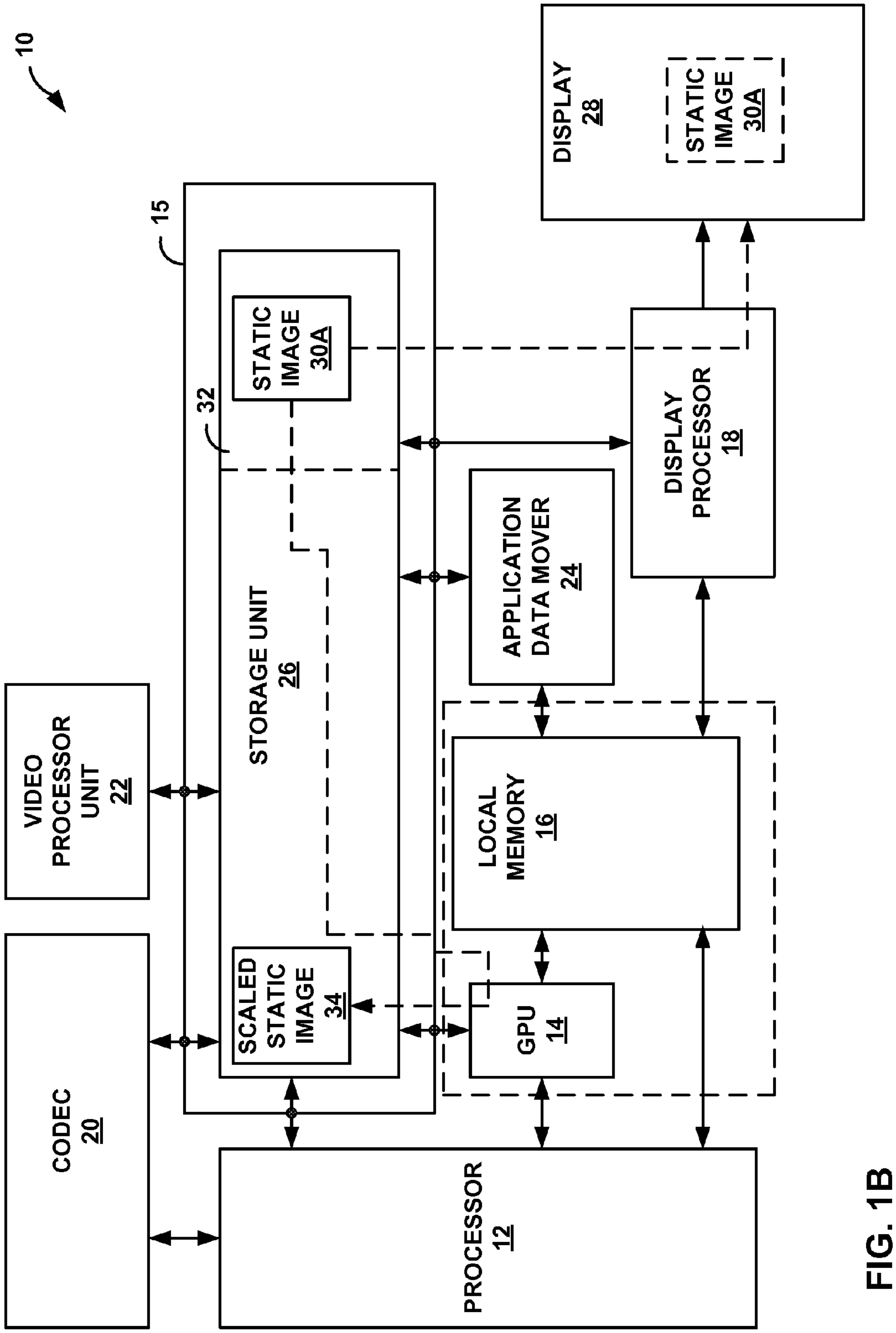
Figure 1C:
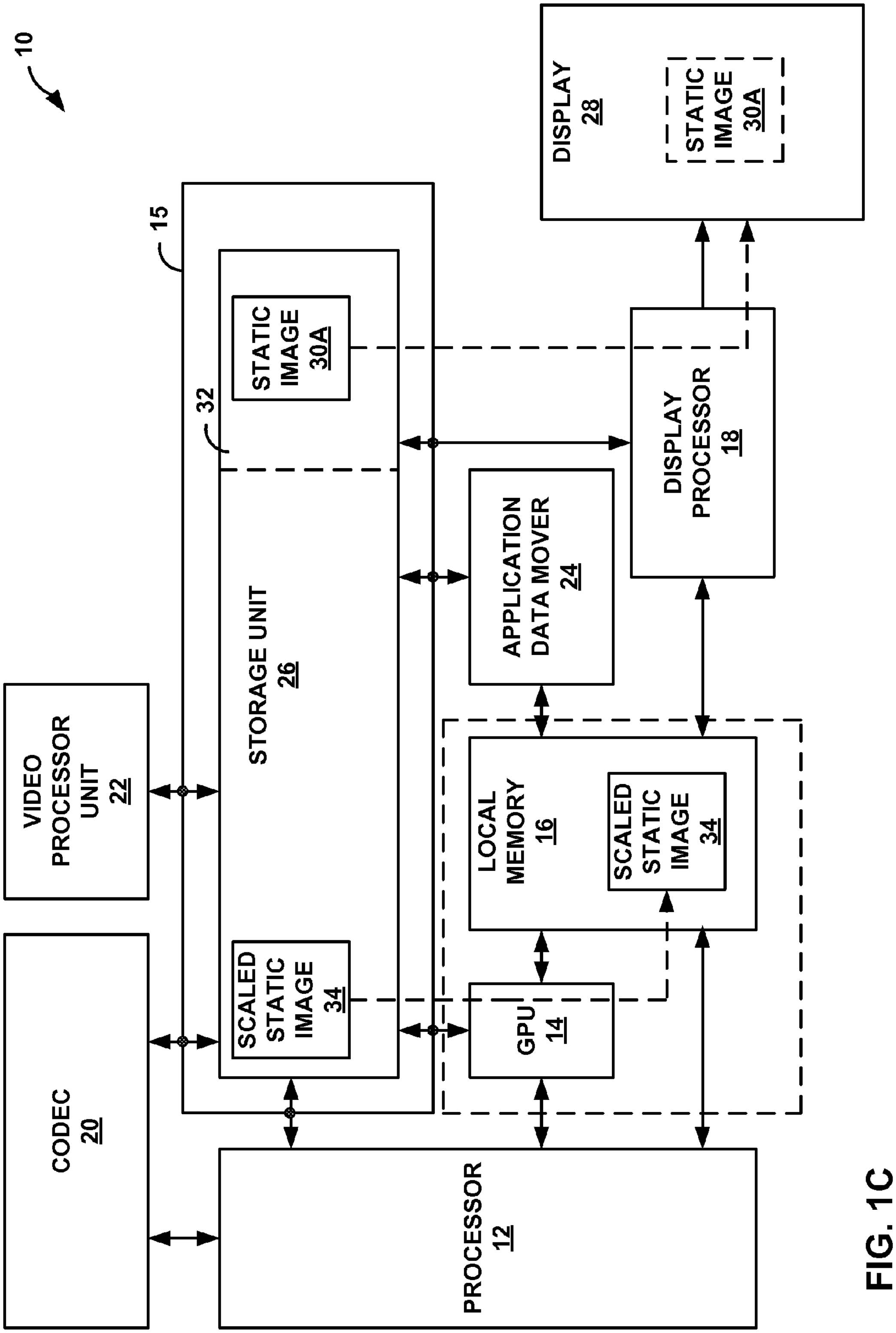
Figure 1D:
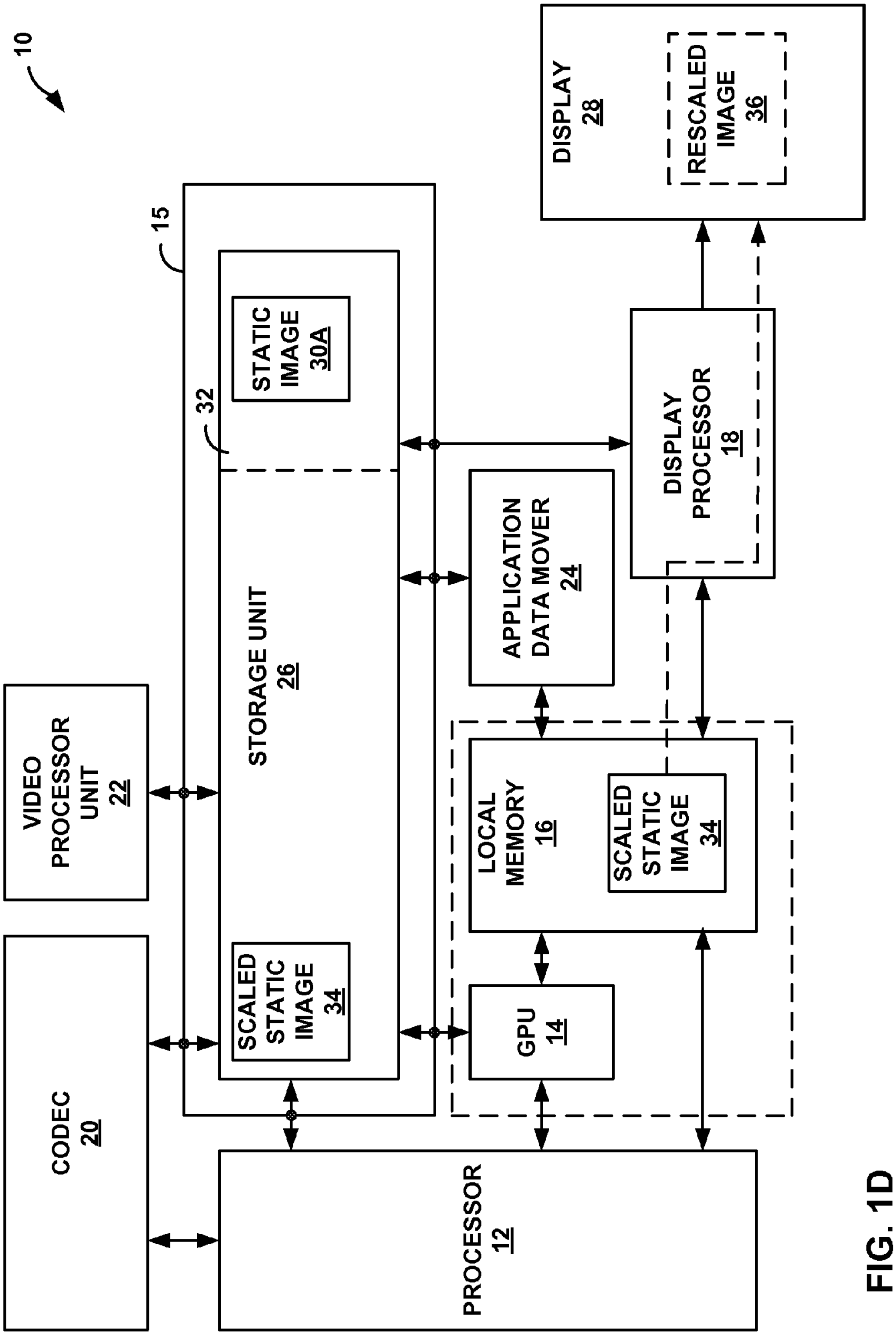

FIGS. 1B and 1C illustrate an example where GPU 14 retrieves image 30 from portion 32 of system memory 26, when processor 12 has determined that image 30 is a static image. For example, FIGS. 1B and 1C illustrate portion 32 of system memory 26 as storing static image 30A. Static image 30A may be substantially similar to image 30 of FIG. 1A. FIGS. 1B and 1C illustrate static image 30A to indicate that in the examples of FIGS. 1B and 1C processor 12 has determined that image 30, of FIG. 1A, is a static image.

As illustrated by the dashed line in FIG. 1B that extends from static image 30A to GPU 14, as one example, GPU 14 may retrieve static image 30A from portion 32 of system memory 26. GPU 14 may scale static image 30A to generate scaled static image 34. Scaled image 34 may be a reduced spatial resolution version of static image 30A. GPU 14 may then store scaled static image 34 in system memory 26. GPU 14 may scale static image 30A such that the amount of storage needed to store scaled static image 34 is less than or equal to the amount of storage in local memory 16, or the amount of storage in local memory 16 that is reserved for storing data from GPU 14. For example, GPU 14 may scale static image 30A based on the amount of storage space available in local memory 16.

GPU 14 may then store scaled static image 34 in local memory 16. For example, as illustrated by the dashed line in FIG. 1C that extends from scaled static image 34 to local memory 16, as one example, GPU 14 may retrieve scaled static image 34 from system memory 26 and store scaled static image 34 in local memory 16. In some alternate examples, GPU 14 may directly store scaled static image 34 in local memory 16 without first storing scaled static image 34 in system memory 26.

Although the examples of FIGS. 1B and 1C illustrate GPU 14 as retrieving static image 30A from portion 32 of system memory 26, scaling static image 30A to generate scaled static image 34, and storing scaled static image 34 in local memory 16, aspects of this disclosure are not so limiting. In general, GPU 14 may be a suitable component to retrieve static image 30A from portion 32 of system memory 26, scale static image 30A to generate scaled static image 34, and store scaled static image 34 in local memory 16 because GPU 14 may not be performing any other functions when display 28 is displaying a static image. However, in some examples, processor 12, or potentially another component of device 10, may retrieve static image 30A from portion 32 of system memory 26, scale static image 30A to generate scaled static image 34, and store scaled static image 34 in local memory 16. For purposes of illustration, the examples described in this disclosure are described in the context of GPU 14 retrieving static image 30A from portion 32 of system memory 26, scaling static image 30A to generate scaled static image 34, and storing scaled static image 34 in local memory 16.

After a version of static image 30A is stored in local memory 16, display processor 18 may retrieve the version of static image 30A stored in local memory 16, e.g., scaled static image 34 which may be a reduced spatial resolution version of static image 30A. For example, as illustrated by the dashed line extending from scaled static image 34 to display processor 18 in FIG. 1D, display processor 18 may retrieve scaled static image 34 from local memory 16, rescale static image 34 to generate rescaled image 36, and output rescaled image 36 to display 28 for presentation. In some examples, display processor 18 may consume less power retrieving scaled static image 34 from local memory 16, as compared to retrieving an image from system memory 26 via system bus 15. In some examples, the power reduction may be a power reduction by a factor of 10. In this manner, some of the example implementations described in this disclosure may promote reduction in power consumption.

In some examples, after one or more of the processing units, e.g., GPU 14, store a version of static image 30A in local memory 16, processor 12 may place GPU 14 in sleep mode. For example, because when processor 12 determines that image 30 is static image 30A, GPU 14 may not be performing any processing, e.g., GPU 14 may be dormant. As described above, GPU 14 may scale static image 30A to generate scaled static image 34, and store scaled static image 34 in local memory 16. To converse power, processor 12 may then place GPU 14 in sleep mode, where in sleep mode, GPU 14 consumes less power. Then, when the functionality of GPU 14 is needed, e.g., the image displayed by display 28 changes, processor 12 may wake-up GPU 14 so that GPU 14 can perform any needed graphics related tasks.

Display processor 18 may rescale scaled static image 34 to assign pixel values to each of the pixels of display 28. For instance, as one example, GPU 14 may substitute a single pixel value for a block of 2×2 pixels of static image 30A to generate scaled static image 34. To rescale scaled static image 34 to generate rescaled image 36, display processor 18 may assign each of the pixel values a block of 2×2 pixels of display 28, that correspond to the block of 2×2 pixels of static image 30A, the value of the single pixel value used to generate scaled static image 34. Rescaled image 36 may then include pixel values for each of the pixels of display 28. Moreover, display processor 18 may apply other techniques to rescale scaled static image 34. Aspects of this disclosure should not be considered limited to the example rescaling techniques described above.

As one example, for purposes of illustration and to ease understanding, assume that display 28 includes 640×480 pixels. In this example, static image 30A may also include 640×480 pixels. To generate scaled static image 34, GPU 14 may assign each pixels in the 2×2 block of pixels in the 640×480 pixels of image 30A one single pixel value. In this example, scaled static image 34 may include 320×240 pixel values (e.g., 640×480 divided 2×2). To rescale scaled static image 34 to generated rescaled image 36, display processor 18 may assign the pixel value to a first 2×2 block of pixels on display 28, the pixel value of the first pixel values in the 320×240 pixel values, and so forth. Accordingly, in this example, four pixels, in a 2×2 block of pixels on display 28, is assigned the same pixel value, whereas four pixels, in a 2×2 block of pixels in static image 30A, may have been assigned different pixel values.

In some examples, the resolution of rescaled image 36 may not be as full or dense as the resolution of static image 30A. For example, the resolution of rescaled image 36 may be less than the resolution of static image 30A. However, the user viewing display 28 may not be able to discern the reduction in clarity. Furthermore, in some examples, the reduction in clarity may not negatively impact the user's experience. For instance, when the user pauses a movie, minor reduction in clarity of the paused image may not be of concern to the user. As another example, the user may generally know the locations of graphical icons on a home-screen. Minor reduction in the clarity of the graphical icons may not affect the user's ability to select any of the graphical icons on the home-screen.

The amount of reduction in the resolution of rescaled image 36 may be based on the type of device 10. As a non-limiting example, if device 10 is a mobile phone, then the reduction in the resolution of rescaled image 36, as compared to the resolution of static image 30A, may be proximately a reduction by a factor of approximately 2.5. As another non-limiting example, if device 10 is a tablet computing device, then the reduction in the resolution of rescale image 36, as compared to the resolution of static image 30A, may be proximately a reduction by a factor of approximately 2. However, these examples are provided for purposes of illustration and should be considered as limiting. The reduction in the resolution of rescaled image 36 need not be limited to a factor of 2 or 2.5 for a mobile phone or tablet computing device, respectively.

In some examples, display processor 18 may perform additional functions, e.g., in addition to retrieving an image from local memory 16, to promote reduction in power consumption. For instance, display processor 18 may refresh display 28 at different refresh rates based on whether display processor 18 is retrieving an image from system memory 26, or from local memory 16. After display processor 18 presents an image on display 28, the illumination level of the pixels on display 28 starts to degrade. For example, pixels on display 28 may be analogized as capacitors that store charge, and the level of the charge may correlate to the illumination level. Overtime, the capacitors being to discharge causing the illumination level to degrade. To address the degradation, display processor 18 may periodically refresh display 28 by presenting the image again, which may be analogized as recharging the capacitors. The number of times display processor 18 refreshes display 28 per second may be referred to as the refresh rate.

For non-static images, e.g., dynamic images, whose content is changing, display processor 18 may refresh display 28 at a relatively fast refresh rate. For example, some televisions provide refresh rates of 120 Hz. Such fast refresh rates may be beneficial for dynamic images because the content of the dynamic images may be changing.

However, for static images whose content is not changing, there may be no benefit in refreshing display 28 at a relatively fast refresh rate. For instance, because the content of a static image is not changing, presenting the same image content of the static image 120 times in one second may not positively impact the user's experience. As one example, when the user is playing a movie, the images of the movie may be dynamic images because the images being presented may be changing from frame-to-frame of the movie. In this instance, it may be beneficial for display processor 18 to refresh display 28 at a relatively fast refresh rate. When the user pauses the movie, the paused scene may be a static image, as there are no changes in the displayed frame. In this instance, it may not be necessary for display processor 18 to refresh display 28 at a relatively fast refresh rate because the content of display 28 is not changing.

In some examples, display processor 18 may refresh display 28 at a first refresh rate when display processor 18 is retrieving an image from system memory 26. For instance, when retrieving a dynamic image or an image that is yet to be classified as a static image, display processor 18 may repeatedly retrieve such images from system memory 26 for presentation on display 28 at the first refresh rate to refresh display 28. Display processor 18 may refresh display 28 at a second refresh rate, that is lower than the first refresh rate, when display processor 18 is retrieving an image from local memory 16. For instance, display processor 18 may repeatedly retrieve scaled static image 34, from local memory 16, rescale scaled static image 34 to generated rescaled image 36, and repeatedly output rescaled image 36 to display 28 for presentation on display 28 at the second refresh rate, that is lower than the first refresh rate.

Reduction in the refresh rate may also promote reduction in power consumption. For example, display processor 18 may consume less power because the number of times per second that display processor 18 needs to retrieve a version of static image 30A from local memory 16 may be less than the number of times per second that display processor 18 needs to retrieve a dynamic image from system memory 26. Also, the number of pixels of scaled static image 34 may be less than the number of pixels of static image 30A. Display processor 18 may consume less power retrieving scaled static image 34 than retrieving static image 30A because of the reduction in the number of pixel values that display processor 18 needs to retrieve per refresh cycle.

The rate of the second refresh rate may be based on various factors. For example, the rate of the second refresh rate may be greater than or equal to the refresh rate at which pixels on display 28 appear to flicker. If the refresh rate is too slow, the pixels on display 28 may appear to flicker, which may impact the user's experience. The appearance of flickering may be caused by quick changes to the illumination level of the pixels on display 28. For example, for a relatively slow refresh rate, the illumination level of the pixels on display 28 may degrade substantially between refresh cycles. Then, after each refresh cycle, where the illumination level of the pixels is reset to the original illumination level, the quick increase in the illumination level may cause the pixels on display 28 to appear as if they are flickering.

The refresh rate at which pixels on display 28 appear to flicker may be based on the design of display 28. In some examples, a refresh rate of greater than or equal to approximately 15 Hz may be sufficient to avoid causing the pixels on display 28 to appear as if they are flickering. In these examples, the second refresh rate may be set to approximately 15 Hz. However, aspects of this disclosure should not be considered so limiting, and the rate of the second refresh rate may be selectable based on the design of display 28, and any other possibly pertinent factors, e.g., the frequency of a clock signal that display processor 18 is capable of generating for the first and second refresh rates.

In some examples, display processor 18 may also determine the illumination intensity of the pixels of display 28. For example, if the level of ambient light is relatively high, display processor 18 may set the illumination intensity of each of the pixels on display 28 higher than it would if the level of ambient light is relatively low. The illumination intensity of the pixels of display 28 may be considered as the brightness of each pixel. In some examples, display processor 18 may reduce the illumination intensity of the pixels of display 28 when display 28 is displaying rescaled image 36.

The power consumed by display 28 to display high illumination intensity pixels may be greater than the power consumed by display 28 to display low illumination intensity pixels. By reducing the illumination intensity of the pixels, when display 28 is displaying rescaled image 36, the power consumed by display 28 may be reduced. In this manner, display processor 18 may further promote reduction in power consumption.

Figure 2:
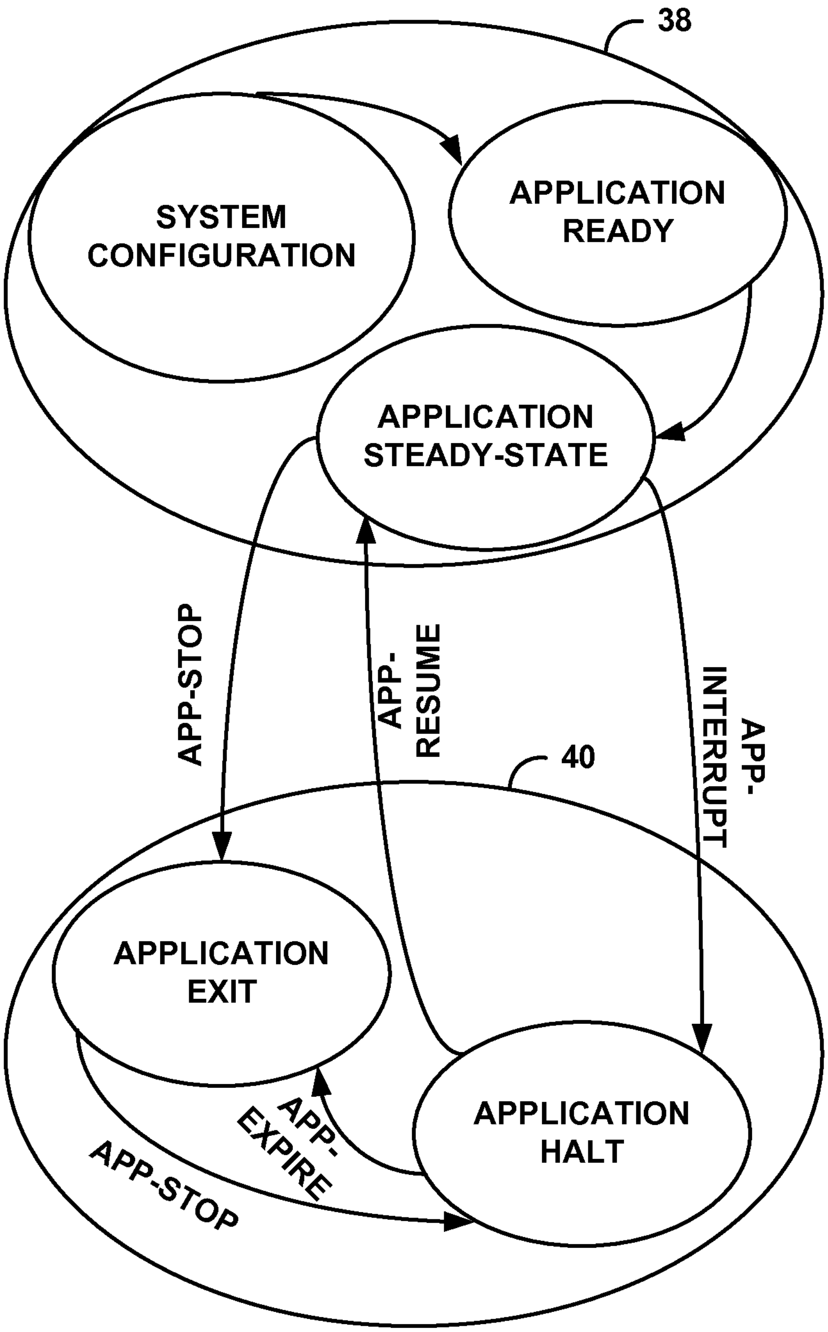
FIG. 2 is a state diagram illustrating some example states where a processing unit may determine an image to be a dynamic image or a static image.

FIG. 2 is a state diagram illustrating some example states where processor 12 determines an image to be a dynamic image or a static image. The examples illustrated in the state diagram of FIG. 2 are used for purposes of illustration, and to ease understanding. Aspects of this disclosure of this disclosure should not be considered limited to the examples of FIG. 2. For instance, although FIG. 2 illustrates some situations which may cause one or more processing units, e.g., processor 12, to determine that an image is a static image, aspects of this disclosure are not so limited to the examples illustrated in FIG. 2.

FIG. 2 illustrates dynamic image state 38 and static image state 40. Examples of situations where the generated images may be dynamic images include images during system configuration, when an application is ready to execute, and when the application reaches steady-state, as illustrated in dynamic image state 38. For example, during system configuration of device 10, any image that is displayed on display 28 may be changing. Also, after system configuration, a user may select an application for execution, e.g., a web-browser, an e-mail application, an application that plays a video, and the like. During such selections, the images displayed on display 28 may be changing. Moreover, after the user executed the application, the application may reach a steady-state. In steady-state, device 10 may be performing the actions of the application. For example, the user may execute an application that plays the movie. In steady-state, device 10 may present the frames of the movies on display 28.

There may be various causes for an image generated by the application in steady-state to be determined to be a static image. For example, the user may halt the application or the user may exit the application and return to the home-screen, as illustrated in static image state 40. As one example, the user may pause the movie. The user pausing the movie is an example of an application interrupt (app-interrupt as illustrated in FIG. 2). The content of the image generated by the application, when the application is halted, may be a static image, e.g., a paused image, whose content does not change. Then, after the user resumes the application (app-resume as illustrated in FIG. 2), the application may return to its steady-state where the images generated by the application are changing, e.g., transition back to dynamic image state 38. In some examples, if the application remains paused for a certain period of time, the application may expire (app-expire as illustrated in FIG. 2) and the user may not be able to return the application back to steady-state. However, the static image generated by the application may still remain on display 28, and may therefore remain in static image state 40.

In some examples, the user may stop the application (app-stop as illustrated in FIG. 2), which may cause display 28 to display a static image. The stopping of the application may cause display 28 to present the home-screen. For example, the stopping of the application may cause the application to halt, and exit to the home-screen. Since the content of the home-screen is generally static, the home-screen may be a static image.

Figure 3A:
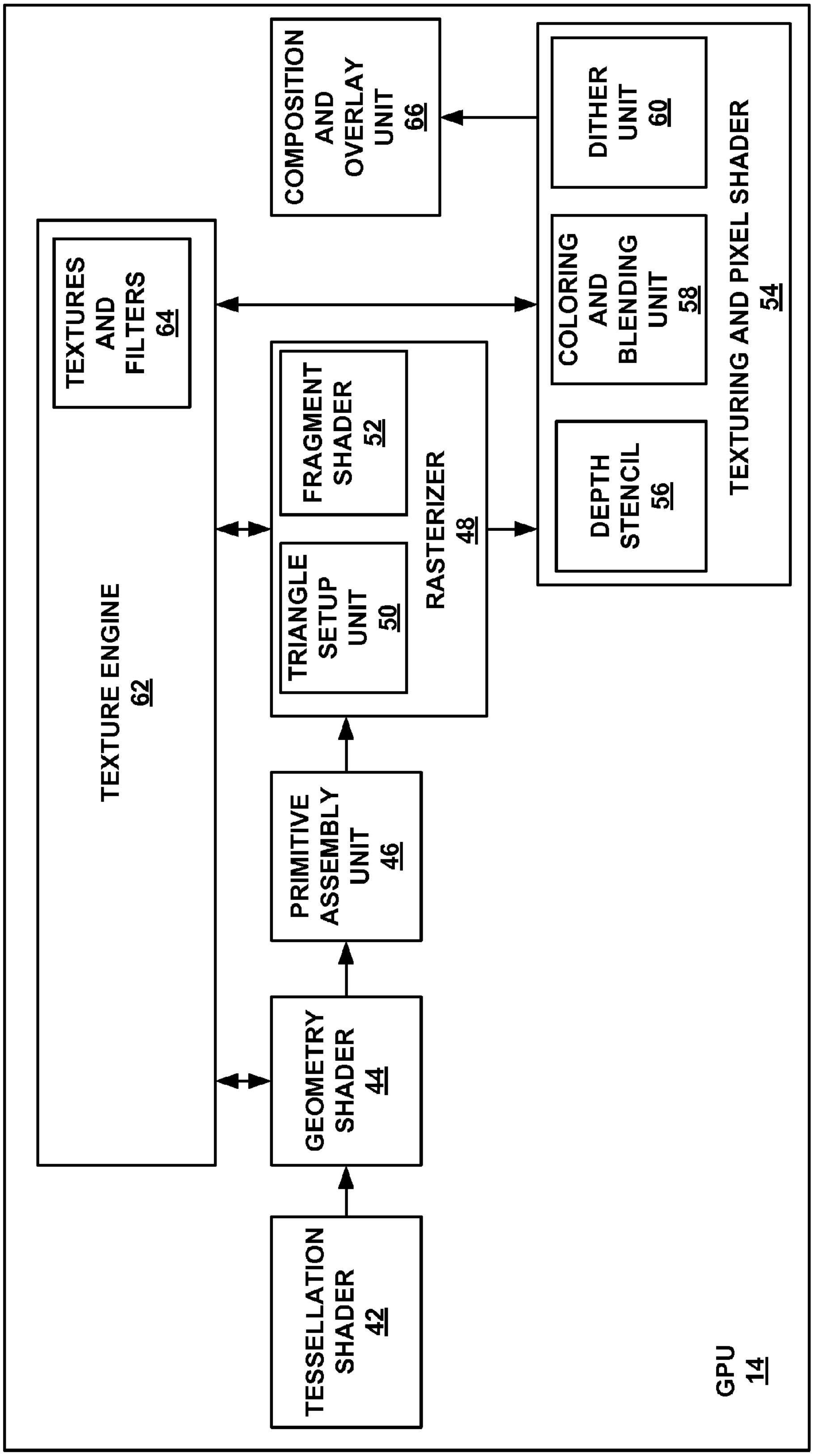
FIGS. 3A and 3B are block diagrams illustrating examples of a graphics processing unit (GPU) of FIGS. 1A-1D in greater detail.
Figure 3B:
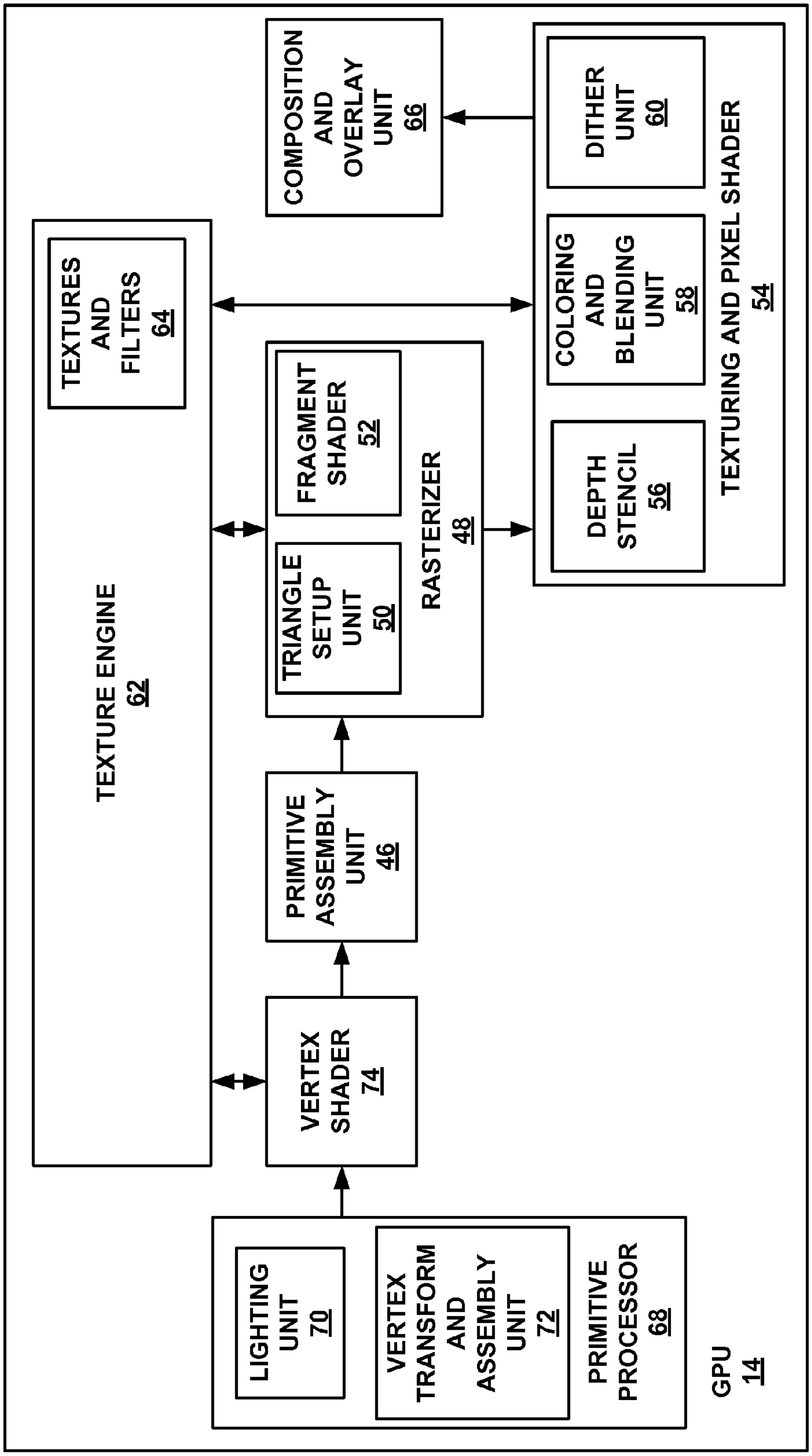

FIGS. 3A and 3B are block diagrams illustrating examples of GPU 14 in greater detail. The examples of GPU 14 are illustrated in greater detail, in FIGS. 3A and 3B, to describe example techniques with which GPU 14 may retrieve static image 30A from portion 32 of system memory 26, rescale static image 30A to generate scaled static image 34, and store scaled static image 34 in local memory 16.

As illustrated in FIG. 3A, in some examples, such as where GPU 14 is a general purpose GPU (GPGPU), GPU 14 may include tessellation shader 42, geometry shader 44, primitive assembly unit 46, rasterizer 48, which includes triangle setup unit 50 and fragment shader 52, texturing and pixel shader 54, which includes depth stencil 56, coloring and blending unit 58, and dither unit 60, texture engine 62, which includes textures and filters 64, and composition and overlay unit 66. In the example of GPU 14, illustrated in FIG. 3B, GPU 14 may include components substantially similar to those of GPU 14 illustrated in FIG. 3A. However, in the example of FIG. 3B, GPU 14 may not include tessellation shader 42 or geometry shader 44. In the example of FIG. 3B, GPU 14 may include primitive processor 68, which includes lighting unit 70 and vertex transform and assembly unit 72, and vertex shader 74.

The example units of the GPU 14, illustrated in FIGS. 3A and 3B, may be implemented as hardware units, software units executing on hardware units, or a combination thereof. Moreover, GPU 14, as illustrated in FIGS. 3A and 3B, may not necessarily include all of the units illustrated in FIGS. 3A and 3B. Also, GPU 14 may include units in addition to those illustrated in FIGS. 3A and 3B.

In the example of FIG. 3A, tessellation shader 42 may receive an image from processor 12 that is to be displayed. Tessellation shader 42 may divide the received image into a plurality of polygons, such as rectangles or triangles. Geometry shader 44 may receive the polygons from tessellation shader 42 and further divide the received polygons. For example, geometry shader 44 may divide the received polygons into primitives. The primitives may be points, lines, or polygons such as triangles. In some examples, geometry shader 44 may determine the color and texture coordinates of each of the vertices of the triangles, coordinates of each point, and coordinates of each line. For example, geometry shader 74 may receive the texture coordinates from textures and filters 64 of texture engine 62.

In the example of FIG. 3B, primitive processor 68 may receive an image from processor 12 that is to be displayed. The image may be a three-dimensional image. Vertex transform and assembly unit 72 may divide the image into a plurality of polygons, such as triangles, and transform the coordinates of the vertices of the triangles into world space coordinates. Lighting unit 70 may determine light sources for the image, and the shading that may occur due to the light sources. Vertex shader 74 may receive the triangles from primitive processor 68 and transform the three-dimensional coordinates into two-dimensional coordinates of display 28. Vertex shader 74 may also determine a depth value for each vertex. In some examples, vertex shader 74 may determine the color and texture coordinates of each of the vertices. For example, vertex shader 74 may receive the texture coordinates from textures and filters 64 of texture engine 62.

Primitive assembly unit 46, in either example of FIG. 3A or FIG. 3B, may composite received coordinates of a primitive. For example, vertex shader 74 may output data for six vertices. Primitive assembly unit 46 may composite the six vertices into two triangles, e.g., three vertices per triangle.

Rasterizer 48, in either example of FIG. 3A or FIG. 3B, may determine which pixels of display 28 belong to which triangles, and may determine color values for the pixels. For example, triangle setup unit 50 may calculate the line equations for the triangles received from primitive assembly unit 46 to determine which pixels of display 28 are within a triangle, and which pixels of display 28 are output the triangle. Fragment shader 52 may determine the color values for each of the pixels of display 28 that are within each of the triangles. In some examples, fragment shader 52 may determine color values based on values within textures and filters 64.

Texturing and pixel shader 54, in either example of FIG. 3A or 3B, may receive the color values and coordinates of each of the pixels from rasterizer 48. Depth stencil 56 may determine whether any of the received pixels are partially or fully occluded by any other pixels, and remove pixels from further processing that are fully occluded. Coloring and blending unit 58 may blend together the colors of different pixels. Dither unit 60 may increase the color depth of the pixels to address the loss of detail during the processing. The output of texturing and pixel shader 54 may be a graphics processed image that texturing and pixel shader 54 outputs to composition and overlay unit 66.

Composition and overlay unit 66, in either example of FIG. 3A or 3B, may determine whether there are any other images that need to be overlaid on top of the image generated by dither unit 60. For example, if there is a mouse cursor, composition and overlay unit 66 may overlay the mouse cursor on top of the image generated by dither unit 60. The resulting image may be one example of the image that is stored in portion 32 of system memory 26, e.g., image 30. If the content of image 30 does not change for a defined period of time, image 30 may be determined to be static image 30A.

In some examples, texturing and pixel shader 54 of GPU 14 may retrieve static image 30A from portion 32 of system memory 26, and store a version of static image 30A in local memory 16, e.g., static image 30A itself, or scaled static image 34. Texturing and pixel shader 54 may be suitable for scaling static image 30A to generated scaled static image 34 because, in some examples, texturing and pixel shader 54 may include a scaling unit for other graphics related purposes. GPU 14 may utilize the scaling unit of texturing and pixel shader 54 to scale static image 30A to generate scaled static image 34.

Figure 4:
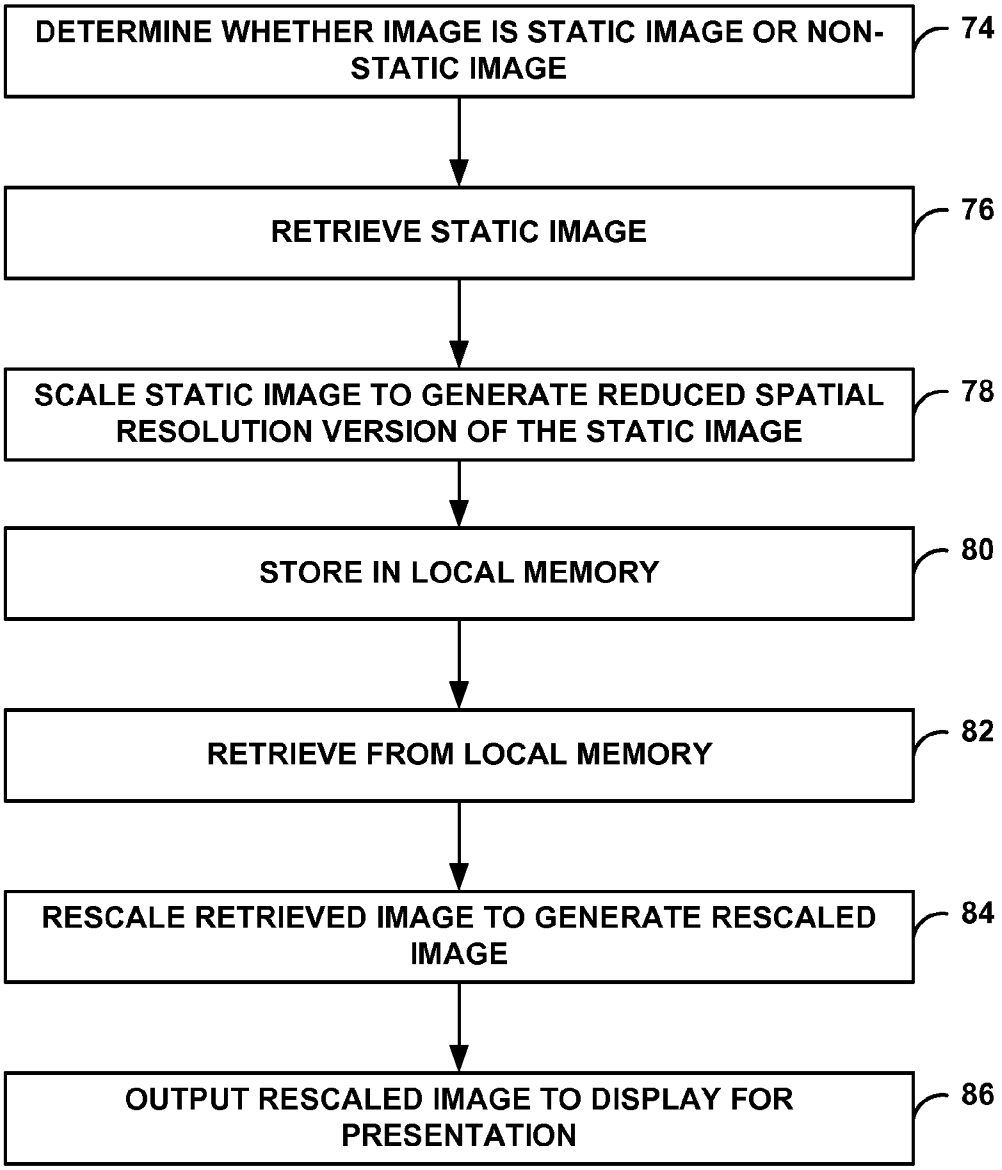
FIG. 4 is a flow chart illustrating an example operation of one or more processing units consistent with this disclosure.

FIG. 4 is a flow chart illustrating an example operation of one or more processing units consistent with this disclosure. For purposes of illustration, reference is made to FIGS. 1A-1D, 3A, and 3B.

One or more processing units, e.g., processor 12, may determine whether image 30 stored in portion 32 of system memory 26 is a static image or a non-static image (74). For example, as described above, processor 12 may monitor the content of portion 32 of system memory 26 to determine whether any component, such as GPU 14, video processor unit 22, codec 20, or application data move 24, provided any new information that changes the content of image 30 within a defined period of time. If portion 32 of system memory 26 did not receive any new information that changes, within a defined period of time, the content of image 30, processor 12 may determine that image 30 is a static image, e.g., static image 30A. In some examples, processor 12 may further determine whether there has been any change in the environment of device 10. For example, processor 12 may determine whether there has been any change in the ambient lighting, device orientation of device 10, or changes in connections of device 10 with another external device. If there has been no change in the environment of device 10, and no component has provided new information that changes the content of image 30, processor 12 may determine that image 30 is a static image, e.g., static image 30A.

When processor 12 determines that image 30 is static image 30A, GPU 14 may retrieve static image 30A from portion 32 of system memory 26 via system bus 15 (76). GPU 14 may scale static image 30A to generate a reduced spatial resolution version of static image 30A, e.g., scaled static image 34 (78). As one example, a shader of GPU 14 such as texture and pixel shader 54 may scale static image 30A. In some examples, GPU 14 may scale static image 30A based on an amount of available storage space in local memory 16. GPU 14 may store scaled static image 34 in local memory 16 (80). In some examples, GPU 14 may store scaled static image 34 in the portion of local memory 16 reserved to store information from GPU 14.

Display processor 18 may retrieve scaled static image 34, e.g., the reduced spatial resolution version of static image 30A from local memory 16 (82). Display processor 18 may rescale scaled static image 34 to generate resealed image 36

(84). Display processor 18 may output resealed image 36 to display 28 for presentation (86).

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage device may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:

determining whether an image stored in at least a portion of a system memory that is accessible via a system bus is a static image or a non-static image;

retrieving, with a graphics processing unit (GPU), the static image from the portion of the system memory via the system bus when the image is determined to be the static image;

scaling, with the GPU, the static image, based on an amount of available storage space in a local memory, to generate a reduced spatial resolution version of the static image;

storing, with the GPU and without using the system bus, the reduced spatial resolution version of the static image in the local memory of the GPU that is external to the system memory;

retrieving, with a display processor coupled to a display and without using the system bus, the reduced spatial resolution version of the static image from the local memory;

rescaling, with the display processor, the reduced spatial resolution version of the static image to generate a rescaled image;

outputting, with the display processor, the rescaled image to the display for presentation; and when the image is determined to be the non-static image, retrieving, with the display processor, the non-static image from the portion of the system memory via the system bus for presentation on the display.

2. The method of claim 1, wherein the local memory comprises an on-chip memory of the GPU.

3. The method of claim 1, further comprising:

when the image is determined to be the non-static image, repeatedly retrieving the non-static image from the portion of the system memory via the system bus for presentation on the display at a first refresh rate, wherein outputting the rescaled image comprises repeatedly outputting the rescaled image at a second refresh rate that is less than the first refresh rate.

4. The method of claim 1, wherein determining whether the image stored in the portion of the system memory is the static image or the non-static image comprises determining that the image is the static image when the portion of the system memory that stores the image receives no new content within a defined period of time.

5. The method of claim 4, further comprising:

determining whether there is any change in an ambient lighting, changes in an orientation of a device that includes the GPU and the display processor, or changes in a connection between the device and another device, wherein determining that the image is the static image comprises determining that the image is the static image when the portion of the system memory that stores the image receives no new content with the defined period of time and when there is no change in the ambient lighting, in the orientation of the device, or in the connection between the device and the another device within the defined period of time.

6. The method of claim 1, further comprising:

reducing an illumination intensity of the display when outputting the rescaled image.

7. The method of claim 1, wherein scaling the static image comprises scaling the static image with a shader of the GPU to generate the reduced spatial resolution version of the static image.

8. The method of claim 1, wherein a clarity of the rescaled image is less than a clarity of the image.

9. An apparatus comprising:

a display;

a system bus;

a system memory that is accessible via the system bus;

a local memory that is external to the system memory;

one or more processing units configured to determine whether an image stored in at least a portion of the system memory is a static image or a non-static image;

a graphics processing unit (GPU) configured to:

retrieve the static image from the portion of the system memory via the system bus when the image is determined to be the static image;

scale the static image, based on an amount of available storage space in the local memory, to generate a reduced spatial resolution version of the static image; and store, without using the system bus, the reduced spatial resolution version of the static image in the local memory; and a display processor configured to:

retrieve, without using the system bus, the reduced spatial resolution version of the static image from the local memory;

rescale the reduced spatial resolution version of the static image to generate a rescaled image; and output the rescaled image to the display for presentation, wherein the display processor is configured to retrieve the non-static image from the portion of the system memory via the system bus for presentation on the display.

10. The apparatus of claim 9, wherein the local memory comprises an on-chip memory of the GPU.

11. The apparatus of claim 9, wherein the display processor repeatedly retrieves the non-static image from the portion of the system memory via the system bus for presentation on the display at a first refresh rate when the image is determined to be the non-static image, and wherein the display processor repeatedly outputs the rescaled image at a second refresh rate that is less than the first refresh rate.

12. The apparatus of claim 9, wherein the one or more processing units determine that the image is the static image when the portion of the system memory that stores the image receives no new content within a defined period of time.

13. The apparatus of claim 12, wherein the one or more processing units determine whether there is any change in an ambient lighting, changes in an orientation of the apparatus, or changes in a connection between the apparatus and another device, and wherein the one or more processing units determine that the image is the static image when the portion of the system memory that stores the image receives no new content within the defined period of the time and when there is no change in the ambient lighting, in the orientation of the apparatus, or in the connection between the apparatus and the another device within the defined period of time.

14. The apparatus of claim 9, wherein the display processor reduces an illumination intensity of the display when the display processor outputs the rescaled image.

15. The apparatus of claim 9, wherein the GPU further comprises a shader, and wherein the shader scales the static image to generate the reduced spatial resolution version of the static image.

16. The apparatus of claim 9, wherein a clarity of the rescaled image is less than a clarity of the image.

17. The apparatus of claim 9, wherein the apparatus comprises at least one of a television, a desktop computer, a laptop computer, an e-book reader, a media player, a tablet computing device, a mobile reception device, a personal digital assistant (PDA), a video gaming console, a mobile conferencing unit, a mobile computing device, and a wireless handset.

18. An apparatus comprising:

a display;

a system bus;

a system memory that is accessible via the system bus;

a local memory that is external to the system memory;

means for determining whether an image stored in at least a portion of the system memory is a static image or a non-static image;

a graphics processing unit (GPU) comprising:

means for retrieving the static image from the portion of the system memory via the system bus when the image is determined to be the static image;

means for scaling the static image, based on an amount of available storage space in the local memory, to generate a reduced spatial resolution version of the static image; and means for storing, without using the system bus, the reduced spatial resolution version of the static image in a local memory of the GPU; and a display processor comprising:

means for retrieving, without using the system bus, the reduced spatial resolution version of the static image from the local memory;

means for rescaling the reduced spatial resolution version of the static image to generate a rescaled image;

means for outputting the rescaled image to the display for presentation; and means for retrieving the non-static image from the portion of the system memory via the system bus for presentation on the display when the image is determined to be the non-static image.

19. The apparatus of claim 18, wherein the local memory comprises an on-chip memory of the GPU.

20. The apparatus of claim 18, further comprising:

when the image is determined to be the non-static image, means for repeatedly retrieving the non-static image from the portion of the system memory via the system bus for presentation on the display at a first refresh rate, wherein the means for outputting the rescaled image comprises means for repeatedly outputting the rescaled image at a second refresh rate that is less than the first refresh rate.

21. The apparatus of claim 18, wherein the means for determining whether the image stored in the portion of the system memory is the static image or the non-static image comprises means for determining that the image is the static image when the portion of the system memory that stores the image receives no new content within a defined period of time.

22. The apparatus of claim 21, further comprising:

means for determining whether there is any change in an ambient lighting, changes in an orientation of the apparatus, or changes in a connection between the apparatus and another device, wherein the means for determining that the image is the static image comprises means for determining that the image is the static image when the portion of the system memory that stores the image receives no new content with the defined period of time and when there is no change in the ambient lighting, in the orientation of the apparatus, or in the connection between the apparatus and the another device within the defined period of time.

23. The apparatus of claim 18, wherein the display processor further comprises means for reducing an illumination intensity of the display when the means for outputting outputs the rescaled image.

24. The apparatus of claim 18, wherein the means for scaling the static image comprises means for scaling the static image with a shader of the GPU to generate the reduced spatial resolution version of the static image.

25. The apparatus of claim 18, wherein a clarity of the resealed image is less than a clarity of the image.

26. The apparatus of claim 18, wherein the apparatus comprises at least one of a television, a desktop computer, a laptop computer, an e-book reader, a media player, a tablet computing device, a mobile reception device, a personal digital assistant (PDA), a video gaming console, a mobile conferencing unit, a mobile computing device, and a wireless handset.

27. A non-transitory computer-readable storage medium comprising instructions that cause one or more processing units to:

determine whether an image stored in at least a portion of a system memory that is accessible via a system bus is a static image or a non-static image;

retrieve, with a graphics processing unit (GPU), the static image from the portion of the system memory via the system bus when the image is determined to be the static image;

scale, with the GPU, the static image, based on an amount of available storage space in a local memory, to generate a reduced spatial resolution version of the static image;

store, with the GPU and without using the system bus, the reduced spatial resolution version of the static image in the local memory of the GPU that is external to the system memory;

retrieve, with a display processor coupled to a display and without using the system bus, the reduced spatial resolution version of the static image from the local memory;

rescale, with the display processor, the reduced spatial resolution version of the static image to generate a rescaled image;

output, with the display processor, the rescaled image to the display for presentation; and retrieve, with the display processor, the non-static image from the portion of the system memory via the system bus for presentation on the display when the image is determined to be the non-static image.

28. The non-transitory computer-readable storage medium of claim 27, wherein the local memory comprises an on-chip memory of the GPU.

29. The non-transitory computer-readable storage medium of claim 27, further comprising:

instructions to repeatedly retrieve the non-static image from the portion of the system memory via the system bus for presentation on the display at a first refresh rate when the image is determined to be the non-static image, wherein the instructions to output the rescaled image comprise instructions to repeatedly output the rescaled image at a second refresh rate that is less than the first refresh rate.

30. The non-transitory computer-readable storage medium of claim 27, wherein the instructions to determine whether the image stored in the portion of the system memory is the static image or the non-static image comprise instructions to determine that the image is the static image when the portion of the system memory that stores the image receives no new content within a defined period of time.

31. The non-transitory computer-readable storage medium of claim 30, further comprising:

instructions to determine whether there is any change in an ambient lighting, changes in an orientation of a device that includes the GPU and the display processor, or changes in a connection between the device and another device, wherein the instructions to determine that the image is the static image comprise instructions to determine that the image is the static image when the portion of the system memory that stores the image receives no new content with the defined period of time and when there is no change in the ambient lighting, in the orientation of the device, or in the connection between the device and the another device within the defined period of time.

32. The non-transitory computer-readable storage medium of claim 27, further comprising:

instructions to reduce an illumination intensity of the display when outputting the rescaled image.

33. The non-transitory computer-readable storage medium of claim 27, wherein the instructions to scale the static image comprise instructions to scale the static image with a shader of the GPU to generate the reduced spatial resolution version of the static image.

34. The non-transitory computer-readable storage medium of claim 27, wherein a clarity of the resealed image is less than a clarity of the image.

* * * * *

UNITED STATES PATENT AND TRADEMARK OFFICE

CERTIFICATE OF CORRECTION

PATENT NO. : 8,847,968 B2
APPLICATION NO. : 13/181300
DATED : September 30, 2014
INVENTOR(S) : Khosro Mohammad Rabii It is certified that error appears in the above-identified patent and that said Letters Patent is hereby corrected as shown below:

Claims

Column 24
Line 56: Claim 25, delete “resealed”, and insert therefor -- rescaled --.

Column 26
Line 40: Claim 34, delete “resealed”, and insert therefor -- rescaled --.

Signed and Sealed this
Tenth Day of November, 2015

Michelle K. Lee
*Director of the United States Patent and Trademark Office*